(12) United States Patent
Goi

(10) Patent No.: US 10,386,573 B2
(45) Date of Patent: Aug. 20, 2019

(54) SUBSTRATE-TYPE OPTICAL WAVEGUIDE AND INTRODUCING METHOD USING FUNDAMENTAL AND HIGHER TE/TM MODES

(71) Applicant: FUJIKURA LTD., Tokyo (JP)

(72) Inventor: Kazuhiro Goi, Chiba (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 16/146,727

(22) Filed: Sep. 28, 2018

(65) Prior Publication Data
US 2019/0101696 A1   Apr. 4, 2019

(30) Foreign Application Priority Data

Sep. 29, 2017  (JP) ................. 2017-190975

(51) Int. Cl.
  *G02B 6/10* (2006.01)
  *G02B 6/14* (2006.01)
  *G02B 6/12* (2006.01)
(52) U.S. Cl.
  CPC ......... *G02B 6/105* (2013.01); *G02B 6/12007* (2013.01); *G02B 6/14* (2013.01); *G02B 2006/12164* (2013.01)
(58) Field of Classification Search
  CPC ............... G02B 6/105; G02B 6/12007; G02B 2006/12164
  See application file for complete search history.

(56) References Cited

U.S. PATENT DOCUMENTS

| | | | | |
|---|---|---|---|---|
| 3,420,600 A | * | 1/1969 | Mevers | G01B 9/02 356/491 |
| 3,500,236 A | * | 3/1970 | Clark | H01S 3/1109 359/340 |
| 3,793,579 A | * | 2/1974 | Cason | H01S 3/121 356/316 |

(Continued)

FOREIGN PATENT DOCUMENTS

JP   2006-309197 A   11/2006

OTHER PUBLICATIONS

T. Shoji, et al., "Low loss mode size converter from 0.3 μm square Si wire waveguides to singlemode fibres" Electronics Letters, vol. 38, No. 25, p. 1669-1670, Dec. 5, 2002 (2 pages).

(Continued)

*Primary Examiner* — Andrew Jordan
(74) *Attorney, Agent, or Firm* — Osha Liang LLP

(57) ABSTRACT

A substrate-type optical waveguide includes: a mode conversion section including a first input light guide path and a first output light guide path; and a polarization conversion and multiplexing section including a second input light guide path and a second output light guide path. The mode conversion section converts light input into the first input light guide path into either: a superposition of a first TE fundamental mode and a first TE higher mode; or a superposition of a first TM fundamental mode and a first TM higher mode. The polarization conversion and multiplexing section converts either: the superposition of the first TE fundamental mode and the first TE higher mode; or the superposition of the first TM fundamental mode and the first TM higher mode, into a superposition of a second TE fundamental mode and a second TM fundamental mode.

8 Claims, 11 Drawing Sheets

(56) References Cited

U.S. PATENT DOCUMENTS

| | | | | |
|---|---|---|---|---|
| 4,606,605 A * | 8/1986 | Ashkin | G02B 6/105 | 385/11 |
| 4,741,588 A * | 5/1988 | Nicia | G02B 6/272 | 385/11 |
| 5,661,825 A * | 8/1997 | Van Dam | G02B 6/120 | 11 385/11 |
| 5,764,665 A * | 6/1998 | Doerr | H01S 5/042 | 372/26 |
| 5,809,184 A * | 9/1998 | Doerr | G02B 6/120 | 16 385/11 |
| 5,848,205 A * | 12/1998 | Bigo | G02F 1/3519 | 385/15 |
| 5,850,491 A * | 12/1998 | Morasca | G02F 1/125 | 385/7 |
| 5,911,015 A * | 6/1999 | Bigo | G02B 6/255 | 385/1 |
| 5,949,925 A * | 9/1999 | Seino | G02F 1/011 | 385/1 |
| 6,046,839 A * | 4/2000 | Ito | G02F 1/125 | 324/244.1 |
| 6,252,698 B1 * | 6/2001 | Oikawa | G02B 6/272 | 359/246 |
| 6,275,623 B1 * | 8/2001 | Brophy | G02B 6/120 | 07 385/1 |
| 6,337,931 B1 * | 1/2002 | Seino | G02B 6/126 | 385/11 |
| 6,370,167 B1 * | 4/2002 | Donati | G02F 1/125 | 359/308 |
| 6,546,165 B2 * | 4/2003 | Yoon | G02B 6/29302 | 359/489.01 |
| 6,724,486 B1 * | 4/2004 | Shull | G02F 1/37 | 356/486 |
| 6,754,403 B1 * | 6/2004 | Schmid | G02F 1/125 | 359/285 |
| 6,798,930 B2 * | 9/2004 | Moeller | G02B 6/120 | 07 385/11 |
| 6,807,379 B2 * | 10/2004 | Brindel | H04B 10/2914 | 398/155 |
| 6,904,189 B2 * | 6/2005 | Frommer | G02F 1/3136 | 385/11 |
| 6,904,204 B2 * | 6/2005 | Hida | G02B 6/120 | 11 385/11 |
| 7,120,340 B2 * | 10/2006 | Berkey | C03B 37/01217 | 385/123 |
| 7,233,720 B2 * | 6/2007 | Yao | G02B 6/02071 | 385/28 |
| 7,356,226 B2 * | 4/2008 | Watanabe | G02B 6/1228 | 385/131 |
| 7,436,867 B2 * | 10/2008 | McDonald | H01S 5/02248 | 372/100 |
| 7,496,244 B2 * | 2/2009 | Berkey | C03B 37/01217 | 359/333 |
| 7,535,631 B2 * | 5/2009 | Brown | G02B 27/1006 | 359/341.1 |
| 7,715,668 B2 * | 5/2010 | Noda | B82Y 20/00 | 385/11 |
| 7,783,139 B2 * | 8/2010 | Noda | B82Y 20/00 | 385/11 |
| 7,970,026 B2 * | 6/2011 | Grishin | H01S 3/1103 | 372/10 |
| 8,116,341 B2 * | 2/2012 | Lei | H05K 3/0035 | 219/121.71 |
| 8,249,466 B2 * | 8/2012 | Hoshida | H04J 14/06 | 356/73.1 |
| 8,280,200 B2 * | 10/2012 | Doi | G02B 6/2726 | 385/11 |
| 8,327,686 B2 * | 12/2012 | Kachanov | G01N 21/1702 | 73/24.02 |
| 8,705,900 B2 * | 4/2014 | Goh | G02F 1/0121 | 385/2 |
| 8,705,901 B2 * | 4/2014 | Fukuda | G02B 6/126 | 359/246 |
| 8,774,567 B2 * | 7/2014 | Doi | G02B 6/2726 | 359/246 |
| 8,879,873 B2 * | 11/2014 | Goh | H04B 10/5161 | 385/3 |
| 8,894,210 B2 * | 11/2014 | Tominaga | G02B 5/30 | 349/62 |
| 9,008,476 B2 * | 4/2015 | Oka | G02B 6/2804 | 385/15 |
| 9,128,242 B2 * | 9/2015 | Kojima | G02B 6/14 | |
| 9,281,901 B2 * | 3/2016 | Yamazaki | H04B 10/61 | |
| 9,335,472 B2 * | 5/2016 | Oka | G02B 6/1228 | |
| 9,500,807 B2 * | 11/2016 | Oka; Akira | G02B 6/1228 | |
| 9,529,151 B2 * | 12/2016 | Goi | G02B 6/126 | |
| 9,557,482 B2 * | 1/2017 | Oka | G02B 6/105 | |
| 9,588,292 B2 * | 3/2017 | Yu | G02B 6/1226 | |
| 9,784,918 B2 * | 10/2017 | Oka | G02B 6/125 | |
| 9,810,842 B2 * | 11/2017 | Oka | G02B 6/125 | |
| 9,835,798 B2 * | 12/2017 | Oka | G02B 6/122 | |
| 9,851,504 B2 * | 12/2017 | Oka | G02B 6/126 | |
| 9,851,505 B2 * | 12/2017 | Oka | G02B 6/125 | |
| 9,874,692 B2 * | 1/2018 | Oka | G02B 6/122 | |
| 9,903,805 B2 * | 2/2018 | Rakitzis | G01N 21/21 | |
| 10,078,232 B1 * | 9/2018 | Vermeulen | G02F 1/011 | |
| 2002/0044732 A1 * | 4/2002 | Yoon | G02B 6/29302 | 385/24 |
| 2003/0161566 A1 * | 8/2003 | Frommer | G02F 1/3136 | 385/11 |
| 2003/0202226 A1 * | 10/2003 | Moeller | G02B 6/12007 | 359/11 |
| 2004/0101016 A1 * | 5/2004 | McDonald | H01S 5/02248 | 372/97 |
| 2004/0247239 A1 * | 12/2004 | Eldada | G02B 6/12007 | 385/27 |
| 2004/0247243 A1 * | 12/2004 | Hida | G02B 6/12011 | 385/37 |
| 2004/0258377 A1 * | 12/2004 | Berkey | C03B 37/01217 | 385/123 |
| 2005/0041922 A1 * | 2/2005 | Yao | G02B 6/02071 | 385/37 |
| 2006/0222297 A1 | 10/2006 | Watanabe | | |
| 2008/0273559 A1 * | 11/2008 | Grishin | H01S 3/1103 | 372/25 |
| 2009/0003753 A1 * | 1/2009 | Berkey | C03B 37/01217 | 385/1 |
| 2009/0162008 A1 * | 6/2009 | Noda | B82Y 20/00 | 385/14 |
| 2009/0232441 A1 * | 9/2009 | Noda | B82Y 20/00 | 385/11 |
| 2010/0135341 A1 * | 6/2010 | Grishin | H01S 3/1103 | 372/18 |
| 2010/0142879 A1 * | 6/2010 | Doi | G02B 6/2726 | 385/2 |
| 2010/0193481 A1 * | 8/2010 | Osako | B23K 26/0673 | 219/121.61 |
| 2010/0296155 A1 * | 11/2010 | Sergeyev | B29D 11/00721 | 359/334 |
| 2012/0213465 A1 * | 8/2012 | Fukuda | G02B 6/126 | 385/11 |
| 2013/0156361 A1 * | 6/2013 | Kojima | G02B 6/14 | 385/11 |
| 2015/0078749 A1 * | 3/2015 | Yamazaki | H04B 10/61 | 398/65 |
| 2015/0104128 A1 * | 4/2015 | Oka | G02B 6/1228 | 385/3 |
| 2016/0062038 A1 * | 3/2016 | Oka | G02B 6/1228 | 385/1 |
| 2016/0118763 A1 * | 4/2016 | Gao | H01S 3/106 | 372/20 |
| 2016/0178841 A1 * | 6/2016 | Oka | G02B 6/105 | 385/11 |
| 2016/0178842 A1 * | 6/2016 | Goi | G02B 6/126 | 385/11 |
| 2016/0195676 A1 * | 7/2016 | Yu | G02B 6/1226 | 385/11 |
| 2017/0017033 A1 * | 1/2017 | Oka | G02B 6/126 | |
| 2017/0139136 A1 * | 5/2017 | Oka | G02B 6/122 | |
| 2017/0176677 A1 * | 6/2017 | Oka | G02B 6/125 | |

(56) References Cited

U.S. PATENT DOCUMENTS

2017/0176678 A1* 6/2017 Oka ................... G02B 6/125
2017/0315050 A1* 11/2017 Rakitzis ............. G01N 21/21
2019/0018193 A1* 1/2019 Chen ................ G02B 6/12014

OTHER PUBLICATIONS

V.R. Almeida, et al., "Nanotaper for compact mode conversion" Optics Letters, vol. 28, No. 15, p. 1302-1304, Aug. 1, 2003 (3 pages).
T. Barwicz, et al., "A Metamaterial Converter Centered at 1490nm for Interfacing Standard Fibers to Nanophotonic Waveguides" in Optical Fiber Communication Conference, p. M2I.3, 2016 (3 pages).
J. H. Schmid, et al., "Subwavelength gratings for broadband and polarization independent fiber-chip coupling with -0.4 dB efficiency" in Optical Fiber Communication Conference, p. M2I.4, 2016 (3 pages).
N. Hatori, et al., "A Hybrid Integrated Light Source on a Silicon Platform Using a Trident Spot-Size Converter" Journal of Lightwave Technology, vol. 32, No. 7, p. 1329-1336, dated Apr. 1, 2014 (8 pages).
J. Wang, et al., "Low-loss and misalignment-tolerant fiber-to-chip edge coupler based on double-tip inverse tapers" in optical Fiber Communication Conference, p. M2I.6, 2016 (3 pages).

\* cited by examiner

SUBSTRATE-TYPE OPTICAL WAVEGUIDE AND INTRODUCING METHOD USING FUNDAMENTAL AND HIGHER TE/TM MODES

This application claims priority under 35 U.S.C. § 119 to Japanese Patent Application No. 2017-190975, filed on Sep. 29, 2017, the entire contents of which are herein incorporated by reference.

TECHNICAL FIELD

The present invention relates to a substrate-type optical waveguide and a method for introducing input light into a substrate-type optical waveguide.

BACKGROUND

A substrate-type optical waveguide is in wide use, which includes a substrate having a surface with light guide paths. A substrate-type optical waveguide including a core made of a high refractive index material such as silicon and indium phosphide has a large refractive index difference between the core and the cladding, and has a strong light confining effect. The substrate-type optical waveguide can thus have a waveguide mode having a small mode field diameter.

The substrate-type optical waveguide typically receives input light to be introduced thereinto that has been outputted from an optical fiber or a laser diode (hereinafter abbreviated as "LD"). An optical fiber or a LD, however, outputs light having a mode field diameter that is typically larger than the mode field diameter of a waveguide mode for a substrate-type optical waveguide. Thus, to increase the coupling efficiency, it is important to, for example, increase the mode field diameter of a waveguide mode for a substrate-type optical waveguide in order to overcome the mismatch between the two mode field diameters.

The mode field diameter of a waveguide mode for a substrate-type optical waveguide may be increased by, for example, using a separation-type light guide path (see Patent Literature 1) or using an inverse-tapered light guide path as a core. Further, Non-Patent Literature 1 discloses, as a method for (i) rendering the mode field of a waveguide mode for a substrate-type optical waveguide flat and also (ii) increasing the mode field diameter, a method of using, as a core, two inverse-tapered light guide paths arranged adjacently to each other. The description below may use the term "mode conversion section" to refer to a light guide path having the function of increasing the mode field diameter of a waveguide mode such as the above light guide paths.

CITATION LIST

Patent Literature

[Patent Literature 1]
Japanese Patent Application Publication, Tokukai, No. 2006-309197 (Publication date: Nov. 9, 2006)

Non-Patent Literature

[Non-Patent Literature 1]
Nobuaki Hatori, Takanori Shimizu, Makoto Okano, Masashige Ishizaka, Tsuyoshi Yamamoto, Yutaka Urino, Masahiko Mori, Takahiro Nakamura, and Yasuhiko Arakawa, "A Hybrid Integrated Light Source on a Silicon Platform Using a Trident Spot-Size Converter", JOURNAL OF LIGHTWAVE TECHNOLOGY, VOL. 32, NO. 7, Apr. 1, 2014

Conventional substrate-type optical waveguides let input light to be coupled to the fundamental mode be partly coupled to a higher mode. In a case where, for instance, the optical axis of input light is misaligned from the optical axis of an input light guide path of the mode conversion section, part of the input light becomes coupled to a higher mode of an output light guide path of the mode conversion section. In a case where a mode conversion section is followed by a single-mode light guide path connected to the mode conversion section (see Non-Patent Literature 1), light coupled to a higher mode of the output light guide path of the mode conversion section is, during the process of entering the single-mode light guide path, radiated as a radiation mode to become a loss. Conventional substrate-type optical waveguides thus have a low efficiency in input light coupling. Further, a larger optical axis misalignment results in an increase of the power of input light coupled to a higher mode and thus a lower coupling efficiency. Conventional substrate-type optical waveguides thus have a low tolerance for an optical axis misalignment.

SUMMARY

One or more embodiments of the present invention provide a substrate-type optical waveguide having (i) an efficiency of input light coupling which efficiency is higher than conventional and (ii) a tolerance for an optical axis misalignment which tolerance is higher than conventional.

A substrate-type optical waveguide in accordance with one or more embodiments of the present invention includes: a mode conversion section having an input light guide path (first input light guide path) and an output light guide path (first output light guide path), the mode conversion section being configured to convert (i) light having been inputted into the input light guide path of the mode conversion section into (ii) either a superposition of a TE fundamental mode (first TE fundamental mode) and a TE higher mode (first TE higher mode) for the output light guide path of the mode conversion section or a superposition of a TM fundamental mode (first TM fundamental mode) and a TM higher mode (first TM higher mode) for the output light guide path of the mode conversion section; and a polarization conversion and multiplexing section having (i) an input light guide path (second input light guide path) connected to the output light guide path of the mode conversion section and (ii) an output light guide path (second output light guide path), the polarization conversion and multiplexing section being configured to convert (i) either a superposition of a TE fundamental mode and a TE higher mode for the input light guide path of the polarization conversion and multiplexing section (the superposition from the mode conversion section) or a superposition of a TM fundamental mode and a TM higher mode for the input light guide path of the polarization conversion and multiplexing section (the superposition from the mode conversion section) into (ii) a superposition of a TE fundamental mode (second TE fundamental mode) and a TM fundamental mode (second TM fundamental mode) for the output light guide path of the polarization conversion and multiplexing section.

An introducing method in accordance with one or more embodiments of the present invention is a method for introducing input light into a substrate-type optical waveguide, the method including the steps of: converting (i) input light having been inputted into a first light guide path into (ii) a superposition of a TE fundamental mode and a TE higher mode for a second light guide path; and converting (i) the superposition of the TE fundamental mode and the TE higher mode for the second light guide path into (ii) a superposition of a TE fundamental mode and a TM fundamental mode for a third light guide path.

One or more embodiments of the present invention provide a substrate-type optical waveguide having (i) an efficiency of input light coupling which efficiency is higher than conventional and (ii) a tolerance for an optical axis misalignment which tolerance is higher than conventional.

DETAILED DESCRIPTION

[Configuration of Substrate-Type Optical Waveguide]

Figure 1:
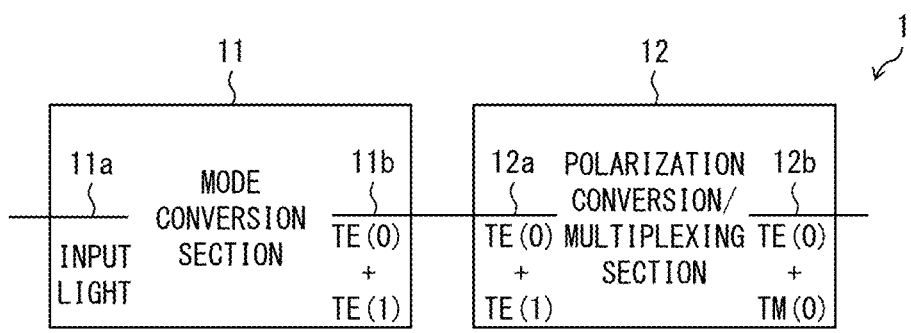
FIG. 1 is a block diagram illustrating a substrate-type optical waveguide in accordance with one or more embodiments of the present invention.

The description below deals with the configuration of a substrate-type optical waveguide 1 in accordance with one or more embodiments of the present invention with reference to FIG. 1. FIG. 1 is a block diagram illustrating a substrate-type optical waveguide 1 in accordance with one or more embodiments.

As illustrated in FIG. 1, the substrate-type optical waveguide 1 includes a mode conversion section 11 and a polarization conversion/multiplexing section 12. The substrate-type optical waveguide 1 receives light that has been outputted from an external device such as an optical fiber and a laser diode. The description below uses the term "input light" to refer to light to be inputted into the substrate-type optical waveguide 1.

The mode conversion section 11 includes (i) an input light guide path 11a and (ii) an output light guide path 11b for which each waveguide mode has a mode field diameter smaller than the mode field diameter of each waveguide mode for the input light guide path 11a. The mode conversion section 11 converts input light having been inputted into the input light guide path 11a into a superposition of a TE fundamental mode TE(0) and TE higher mode TE(1) for the output light guide path 11b. Example configurations of the mode conversion section 11 will be described later with reference to other drawings.

The polarization conversion/multiplexing section 12 includes an input light guide path 12a and an output light guide path 12b. The input light guide path 12a of the polarization conversion/multiplexing section 12 is configured similarly to the output light guide path 11b of the mode conversion section 11, and is connected to the output light guide path 11b of the mode conversion section 11. Thus, the individual waveguide modes for the output light guide path 11b of the mode conversion section 11 are each coupled to a corresponding waveguide mode for the input light guide path 12a of the polarization conversion/multiplexing section 12. The polarization conversion/multiplexing section 12 converts the superposition of the TE fundamental mode TE(0) and TE higher mode TE(1) for the input light guide path 12a into a superposition of a TE fundamental mode TE(0) and TM fundamental mode TM(0) for the output light guide path 12b. Example configurations of the polarization conversion/multiplexing section 12 will be described later with reference to other drawings.

The polarization conversion/multiplexing section 12 converts the superposition of the TE fundamental mode TE(0) and TE higher mode TE(1) for the input light guide path 12a into a superposition of a TE fundamental mode TE(0) and TM fundamental mode TM(0) for the output light guide path 12b in presumably one of the following two manners:

The first manner is to (i) convert the TE fundamental mode TE(0) for the input light guide path 12*a* into a superposition of a TE fundamental mode TE(0) and TM fundamental mode TM(0) for the output light guide path 12*b* and also (ii) convert the TE higher mode TE(1) for the input light guide path 12*a* into a superposition of a TE fundamental mode TE(0) and TM fundamental mode TM(0) for the output light guide path 12*b*. A first example configuration described later of the polarization conversion/multiplexing section 12 embodies this manner.

The second manner is to (i) convert the TE fundamental mode TE(0) for the input light guide path 12*a* into a TE fundamental mode TE(0) for the output light guide path 12*b* and also (ii) convert the TE higher mode TE(1) for the input light guide path 12*a* into a TM fundamental mode TM(0) for the output light guide path 12*b*. A second example configuration described later of the polarization conversion/multiplexing section 12 embodies this manner.

Output light of the polarization conversion/multiplexing section 12 may be used inside the substrate-type optical waveguide 1 or outputted to the outside of the substrate-type optical waveguide 1. In the latter case, output light of the polarization conversion/multiplexing section 12 may be outputted to the outside of the substrate-type optical waveguide 1 directly or may be outputted to the outside of the substrate-type optical waveguide 1 via another functional device subsequent to the polarization conversion/multiplexing section 12. In one or more embodiments where output light of the substrate-type optical waveguide 1 is to be inputted into an optical fiber, in particular, the polarization conversion/multiplexing section 12 is followed by a spot-size changer to increase the spot size of the output light of the substrate-type optical waveguide 1. This configuration reduces a possible spot-size mismatch between the substrate-type optical waveguide 1 and the optical fiber to increase the efficiency of coupling between the substrate-type optical waveguide 1 and the optical fiber.

[Effects of Substrate-Type Optical Waveguide]

Conventional substrate-type optical waveguides including a mode conversion section followed by a single-mode light guide path connected to the mode conversion section let most of a TE higher mode TE(1) excited on the output light guide path of the mode conversion section be coupled to a radiation mode. Thus, conventional substrate-type optical waveguides are such that most of a TE higher mode TE(1) excited on the output light guide path of the mode conversion section becomes a loss and is unusable.

Conventional substrate-type optical waveguides thus have a low tolerance for a misalignment between the optical axis of input light and the optical axis of the input light guide path of the mode conversion section. This is because such a misalignment causes most of a TE higher mode TE(1) excited on the output light guide path of the mode conversion section to become a loss.

The substrate-type optical waveguide 1 according to one or more embodiments is, on the other hand, configured such that most of a TE higher mode TE(1) excited on the output light guide path 11*b* of the mode conversion section 11 is coupled to a waveguide mode of the output light guide path 12*b* of the polarization conversion/multiplexing section 12. With this configuration, the substrate-type optical waveguide 1 of one or more embodiments allows most of a TE higher mode TE(1) excited on the output light guide path 11*b* of the mode conversion section 11 to avoid becoming a loss and be used.

The substrate-type optical waveguide 1 of one or more embodiments thus has a high tolerance for a misalignment between the optical axis of input light and the optical axis of the input light guide path 11*a* of the mode conversion section 11. This is because such a misalignment does not cause most of a TE higher mode TE(1) excited on the output light guide path 11*b* of the mode conversion section 11 to become a loss.

The substrate-type optical waveguide 1 of one or more embodiments is configured such that the mode conversion section 11 converts input light having been inputted into the input light guide path 11*a* into a superposition of a TE fundamental mode TE(0) and TE higher mode TE(1) for the output light guide path 11*b*. Embodiments of the present invention are, however, not limited to such a configuration. The mode conversion section 11 may alternatively be configured to, instead of converting input light having been inputted into the input light guide path 11*a* into a superposition of a TE fundamental mode TE(0) and TE higher mode TE(1) for the output light guide path 11*b*, convert input light having been inputted into the input light guide path 11*a* into a superposition of a TM fundamental mode TM(0) and TM higher mode TM(1) for the output light guide path 11*b*. In this case, the polarization conversion/multiplexing section 12 converts the superposition of the TM fundamental mode TM(0) and TM higher mode TM(1) for the input light guide path 12*a* into a superposition of a TE fundamental mode TE(0) and TM fundamental mode TM(0) for the output light guide path 12*b*. This configuration allows effects to be produced that are similar to those produced by the substrate-type optical waveguide 1 of one or more embodiments.

[First Example Configuration of Mode Conversion Section]

Figure 2A:
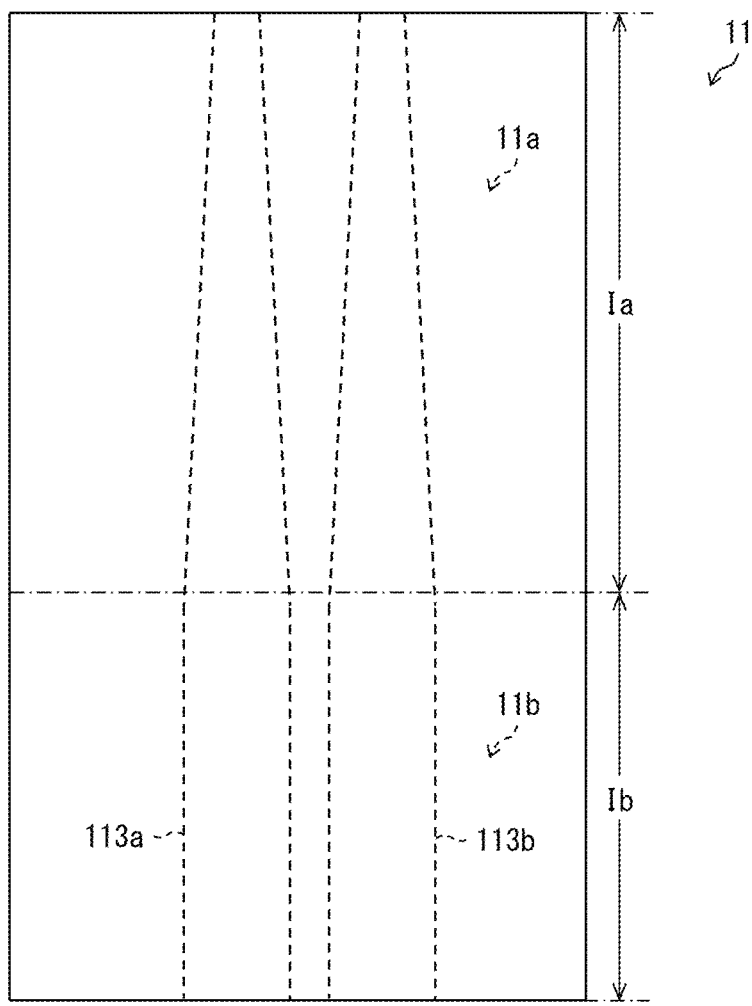
FIG. 2A is a top view of a first example configuration of a mode conversion section in accordance with one or more embodiments.
Figure 2B:
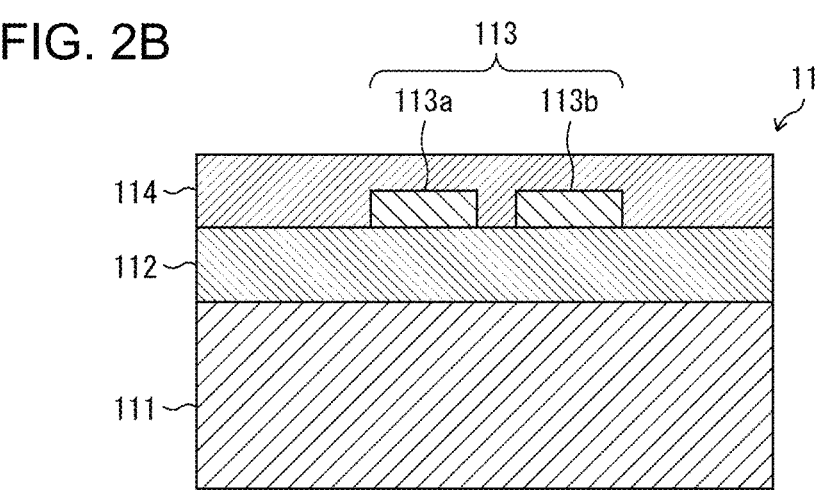
FIG. 2B is a cross-sectional view of the first example configuration of the mode conversion section in accordance with one or more embodiments.

The description below deals with a first example configuration of the mode conversion section 11 of the substrate-type optical waveguide 1 in accordance with one or more embodiments with reference to FIGS. 2A and 2B. FIG. 2A is a top view of a mode conversion section 11 having the present example configuration in accordance with one or more embodiments. FIG. 2B is a cross-sectional view of the mode conversion section 11 having the present example configuration in accordance with one or more embodiments.

The mode conversion section 11 having the present example configuration includes (1) a substrate 111, (2) a lower cladding layer 112 disposed on the substrate 111, (3) two cores 113*a* and 113*b* disposed on the lower cladding layer 112, and (4) an upper cladding layer 114 disposed on the lower cladding layer 112 in such a manner as to bury the two cores 113*a* and 113*b*. The lower cladding layer 112 and the upper cladding layer 114 each have a refractive index lower than the refractive index of each of the cores 113*a* and 113*b*. The substrate 111 and the cores 113*a* and 113*b* may each be made of silicon, for example. The lower cladding layer 112 and the upper cladding layer 114 may each be made of silica, for example. In other words, the mode conversion section 11 may be a silicon light guide path, for example.

The mode conversion section 11 having the present example configuration is configured such that the two cores 113*a* and 113*b* are arranged adjacently to each other and that the core 113*a* has a waveguide mode optically coupled to a waveguide mode of the core 113*b*. The two cores 113*a* and 113*b* thus function as a single light guide path.

The mode conversion section 11 is divided into two segments Ia and Ib on the basis of the structure. The two cores 113*a* and 113*b* function as the above input light guide path 11*a* in the input-side segment Ia and as the above output light guide path 11*b* in the output-side segment Ib.

The segment Ia has a pair of inverse-tapered light guide paths as the cores 113*a* and 113*b* (input light guide path 11*a*).

The inverse-tapered light guide paths each have a rectangular cross section and each have a width that becomes smaller toward the entrance end surface. This means that in the segment Ia, the cores 113*a* and 113*b* each have a waveguide mode having a mode field diameter that becomes gradually larger toward the entrance end surface.

The segment Ib has a pair of rectangular light guide paths as the cores 113*a* and 113*b* (output light guide path 11*b*). A rectangular light guide path is a light guide path having a rectangular cross section and having a width and height that are uniform across the length. The cores 113*a* and 113*b* have respective widths in the segment Ib which widths are equal to the respective widths of the cores 113*a* and 113*b* at the end of the segment Ia which end is on the side of the segment Ib.

The mode conversion section 11 is configured such that input light having been inputted into the input light guide path 11*a* propagates through the input light guide path 11*a* while gradually decreasing its mode field diameter and is coupled to a TE fundamental mode TE(0) or TE higher mode TE(1) for the output light guide path 11*b*. Thus, as described above, the mode conversion section 11 has the function of converting input light having been inputted into the input light guide path 11*a* into a superposition of a TE fundamental mode TE(0) and TE higher mode TE(1) for the output light guide path 11*b*.

For the superimposition on the output light guide path 11*b*, the respective weights of the TE fundamental mode TE(0) and the TE higher mode TE(1) depend on the symmetry of the beam profile of the input light and on the amount of optical axis misalignment. In a case where (i) input light has a beam profile with line symmetry and (ii) the axis of symmetry of the beam profile coincides, on the entrance end surface of the mode conversion section 11, with the perpendicular bisector of a line segment connecting the respective centers of the two cores 113*a* and 113*b*, most of light having been inputted into the input light guide path 11*a* becomes coupled to a TE fundamental mode TE(0) for the output light guide path 11*b*. This means that for the superimposition on the output light guide path 11*b*, the weight of the TE fundamental mode TE(0) has a value near 1, whereas the weight of the TE higher mode TE(1) has a value near 0. If input light has a beam profile with no symmetry or the optical axis misalignment is large, for the superimposition on the output light guide path 11*b*, the weight of the TE fundamental mode TE(0) is small, whereas the weight of the TE higher mode TE(1) is large.

Figure 3A:
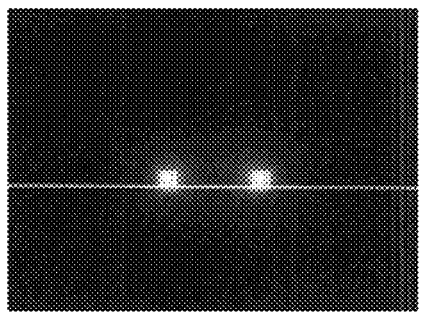
FIG. 3A is a graph illustrating a mode profile of a TE fundamental mode TE(0) excited on the input light guide path of the mode conversion section in accordance with one or more embodiments.
Figure 3B:
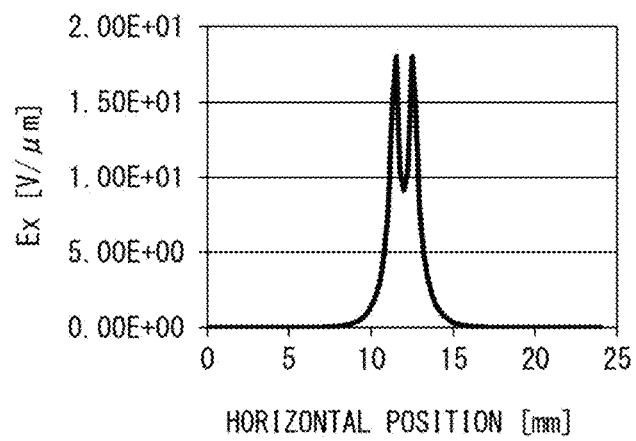
FIG. 3B is a graph illustrating an electric field distribution of the TE fundamental mode TE(0) in accordance with one or more embodiments.
Figure 3C:
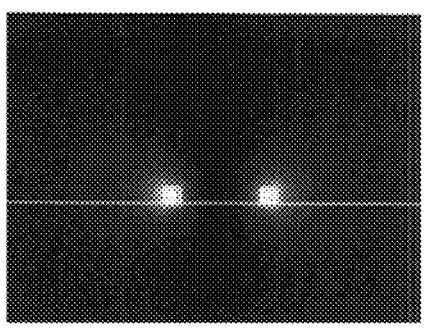
FIG. 3C is a graph illustrating a mode profile of a TE higher mode TE(1) excited on the input light guide path of the mode conversion section in accordance with one or more embodiments.
Figure 3D:
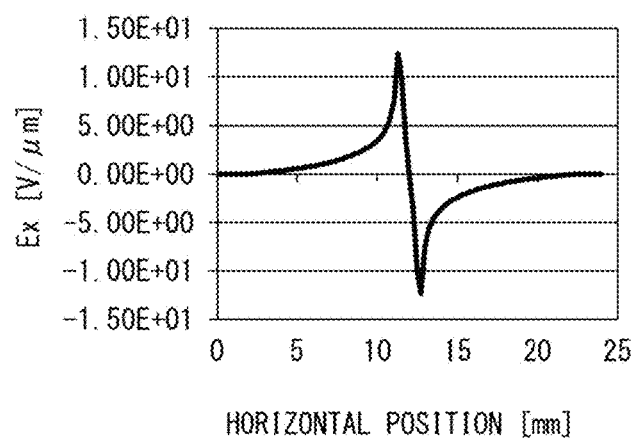
FIG. 3D is a graph illustrating an electric field distribution of the TE higher mode TE(1) in accordance with one or more embodiments.

FIG. 3A is a graph illustrating a mode profile of a TE fundamental mode TE(0) excited on the input light guide path 11*a* of the mode conversion section 11 in accordance with one or more embodiments. FIG. 3B is a graph illustrating an electric field distribution of the TE fundamental mode TE(0) in accordance with one or more embodiments. As is clear from FIGS. 3A and 3B, the TE fundamental mode TE(0) excited on the input light guide path 11*a* of the mode conversion section 11 is a symmetric mode. The TE fundamental mode TE(0) excited on the output light guide path 11*b* of the mode conversion section 11 is similarly a symmetric mode. FIG. 3C is a graph illustrating a mode profile of a TE higher mode TE(1) excited on the input light guide path 11*a* of the mode conversion section 11 in accordance with one or more embodiments. FIG. 3D is a graph illustrating an electric field distribution of the TE higher mode TE(1) in accordance with one or more embodiments. As is clear from FIGS. 3C and 3D, the TE higher mode TE(1) excited on the input light guide path 11*a* of the mode conversion section 11 is an antisymmetric mode. The TE higher mode TE(1) excited on the output light guide path 11*b* of the mode conversion section 11 is similarly an antisymmetric mode. The mode profiles and electric field distributions shown in FIGS. 3A-3D were calculated on the following conditions: The cores 113*a* and 113*b* each had a width of 180 nm. The cores 113*a* and 113*b* each had a height of 220 nm. The cores 113*a* and 113*b* were separated from each other by a distance of 1 μm.

[Second Example Configuration of Mode Conversion Section]

Figure 4A:
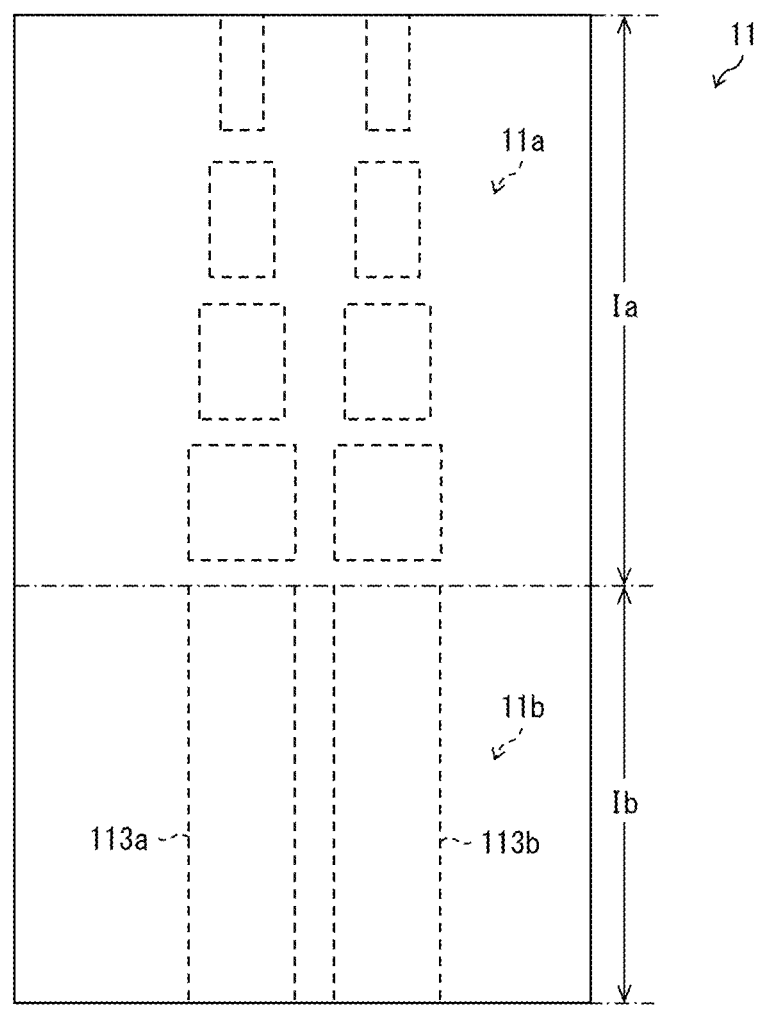
FIG. 4A is a top view of a second example configuration of a mode conversion section in accordance with one or more embodiments.
Figure 4B:
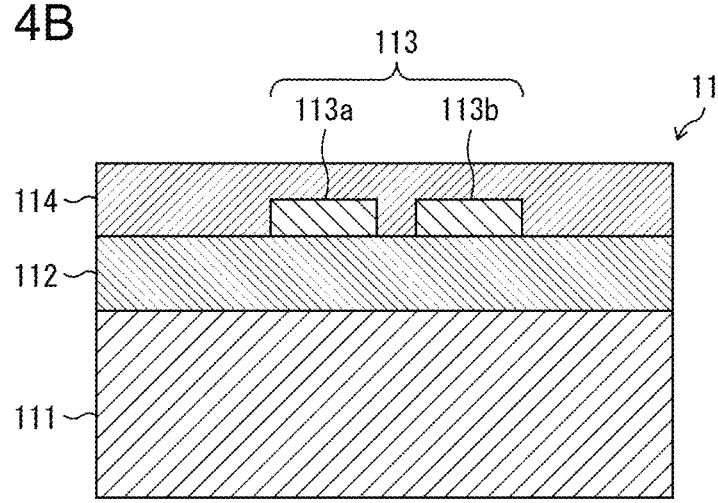
FIG. 4B is a cross-sectional view of the second example configuration of the mode conversion section in accordance with one or more embodiments.

The description below deals with a second example configuration of the mode conversion section 11 of the substrate-type optical waveguide 1 with reference to FIGS. 4A and 4B. FIG. 4A is a top view of a mode conversion section 11 having the present example configuration in accordance with one or more embodiments. FIG. 4B is a cross-sectional view of the mode conversion section 11 having the present example configuration in accordance with one or more embodiments.

The mode conversion section 11 having the present example configuration includes (1) a substrate 111, (2) a lower cladding layer 112 disposed on the substrate 111, (3) two cores 113*a* and 113*b* disposed on the lower cladding layer 112, and (4) an upper cladding layer 114 disposed on the lower cladding layer 112 in such a manner as to bury the two cores 113*a* and 113*b*. The lower cladding layer 112 and the upper cladding layer 114 each have a refractive index lower than the refractive index of each of the cores 113*a* and 113*b*. The substrate 111 and the cores 113*a* and 113*b* may each be made of silicon, for example. The lower cladding layer 112 and the upper cladding layer 114 may each be made of silica, for example. In other words, the mode conversion section 11 may be a silicon light guide path.

The mode conversion section 11 having the present example configuration is configured such that the two cores 113*a* and 113*b* are arranged adjacently to each other and that the core 113*a* has a waveguide mode optically coupled to a waveguide mode of the core 113*b*. The two cores 113*a* and 113*b* thus function as a single light guide path.

The mode conversion section 11 is divided into two segments Ia and Ib on the basis of the structure. The two cores 113*a* and 113*b* function as the above input light guide path 11*a* in the input-side segment Ia and as the above output light guide path 11*b* in the output-side segment Ib.

The segment Ia has a pair of divided light guide paths as the cores 113*a* and 113*b* (input light guide path 11*a*). A divided light guide path is a light guide path including divisional blocks that are arranged in the light traveling direction, adjacent ones of the divisional blocks being separated from each other by a distance smaller than the wavelength of input light. The present example configuration, in particular, uses divided light guide paths each including blocks having respective widths that become smaller toward the entrance end surface. This means that in the segment Ia, the cores 113*a* and 113*b* each have a waveguide mode having a mode field diameter that becomes gradually larger toward the entrance end surface.

The segment Ib has a pair of rectangular light guide paths as the cores 113*a* and 113*b* (output light guide path 11*b*). A rectangular light guide path is a light guide path having a rectangular cross section and having a width and height that are uniform across the length. The cores 113*a* and 113*b* have respective widths in the segment Ib which widths are equal to the respective widths of the cores 113*a* and 113*b* at the end of the segment Ia which end is on the side of the segment Ib.

The mode conversion section 11 having the present example configuration is similar in function to the mode conversion section 11 having the first example configuration.

The present example configuration uses, as the cores 113a and 113b constituting the input light guide path 11a, divided light guide paths each including blocks having respective widths that become smaller toward the entrance end surface. Embodiments of the present invention are, however, not limited to such a configuration. One or more embodiments of the present invention may alternatively include, as the cores 113a and 113b constituting the input light guide path 11a, divided light guide paths in each of which the proportion of portions at each of which a block is present becomes smaller toward the entrance end surface. One or more embodiments of the present invention may, for example, include, as the cores 113a and 113b constituting the input light guide path 11a, divided light guide paths in each of which (i) adjacent blocks are separated from each other by a uniform distance and (ii) the blocks have respective lengths that become smaller toward the entrance end surface. One or more embodiments of the present invention may alternatively, for example, include, as the cores 113a and 113b constituting the input light guide path 11a, divided light guide paths in each of which (i) the blocks have a uniform length and (ii) adjacent blocks are separated from each other by distances that become larger toward the entrance end surface.

[First Example Configuration of Polarization Conversion/Multiplexing Section]

Figure 5:
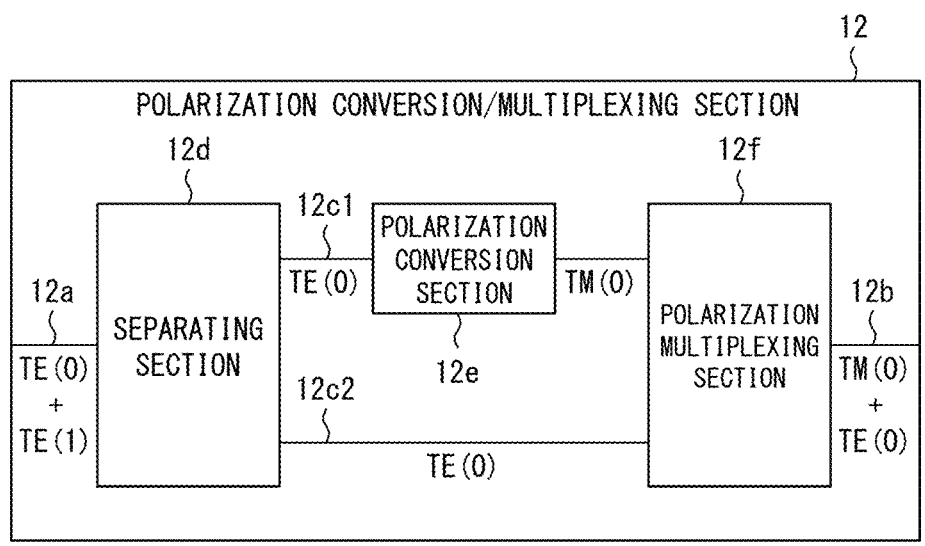
FIG. 5 is a block diagram illustrating a first example configuration of a polarization conversion/multiplexing section in accordance with one or more embodiments.

The description below deals with a first example configuration of the polarization conversion/multiplexing section 12 of the substrate-type optical waveguide 1 with reference to FIG. 5. FIG. 5 is a block diagram illustrating a polarization conversion/multiplexing section 12 having the present example configuration in accordance with one or more embodiments.

As illustrated in FIG. 5, the polarization conversion/multiplexing section 12 having the present example configuration includes an input light guide path 12a, an output light guide path 12b, a first intermediate light guide path 12c1, a second intermediate light guide path 12c2, a separating section 12d, a polarization conversion section 12e, and a polarization multiplexing section 12f. The first intermediate light guide path 12c1 and the second intermediate light guide path 12c2 are arranged apart from each other. The first intermediate light guide path 12c1 has a waveguide mode that is not optically coupled to a waveguide mode of the second intermediate light guide path 12c2.

The separating section 12d converts a TE fundamental mode TE(0) and TE higher mode TE(1) for the input light guide path 12a respectively into a TE fundamental mode TE(0) for the input-side portion of the first intermediate light guide path 12c1 and a TE fundamental mode TE(0) for the second intermediate light guide path 12c2. The input-side portion of the first intermediate light guide path 12c1 refers to that portion of the first intermediate light guide path 12c1 which extends from the input-side end of the first intermediate light guide path 12c1 to the polarization conversion section 12e. An example of the separating section 12d will be described later with reference to another drawing.

The polarization conversion section 12e converts the TE fundamental mode TE(0) for the input-side portion of the first intermediate light guide path 12c1 into a TM fundamental mode TM(0) for the output-side portion of the first intermediate light guide path 12c1. The output-side portion of the first intermediate light guide path 12c1 refers to that portion of the first intermediate light guide path 12c1 which extends from the polarization conversion section 12e to the output-side end of the first intermediate light guide path 12c1. The polarization conversion section 12e may be, for example, a publicly known polarization rotator of a light guide path type.

The polarization multiplexing section 12f multiplexes the TM fundamental mode TM(0) for the output-side portion of the first intermediate light guide path 12c1 and the TE fundamental mode TE(0) for the second intermediate light guide path 12c2. This causes a TE fundamental mode TE(0) and a TM fundamental mode TM(0) to be excited on the output light guide path 12b. The polarization multiplexing section 12f may be, for example, a publicly known directional coupler.

The polarization conversion/multiplexing section 12 having the present example configuration converts a TE fundamental mode TE(0) and TE higher mode TE(1) for the input light guide path 12a respectively into a superposition of a TE fundamental mode TE(0) and TM fundamental mode TM(0) for the output light guide path 12b.

[Example of Separating Section]

Figure 6A:
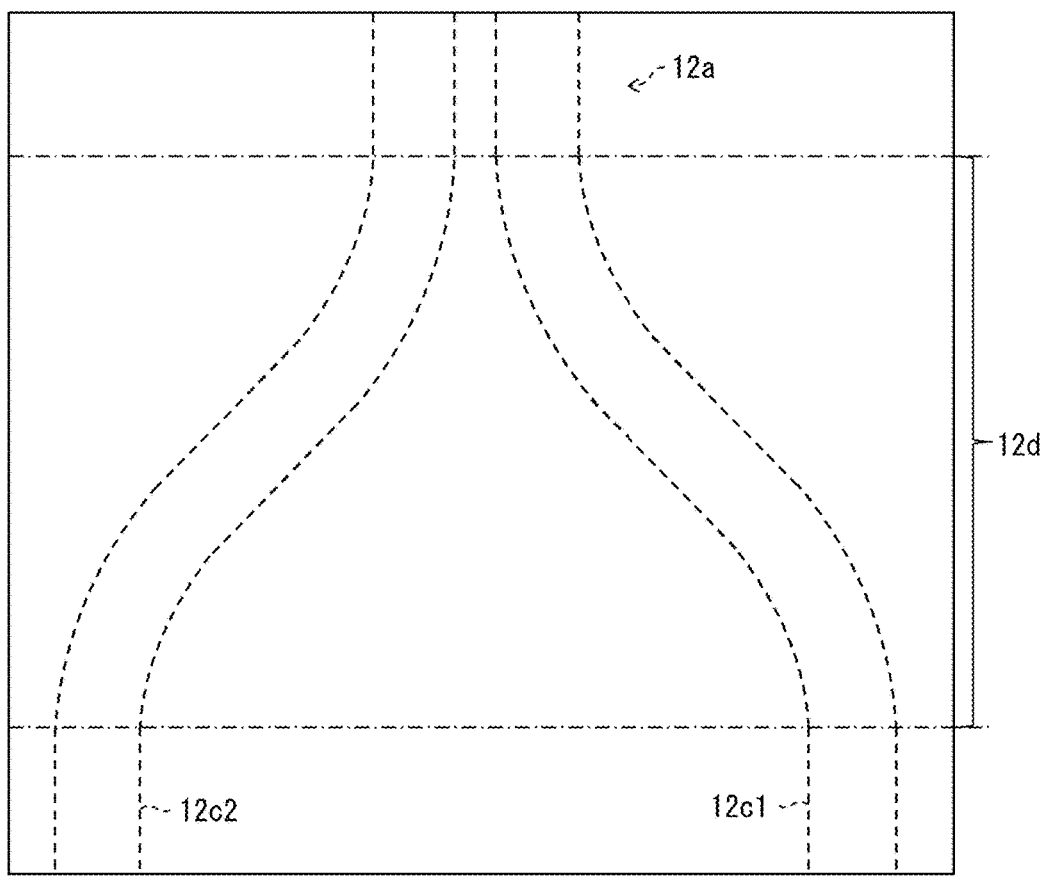
FIG. 6A is a plan view of an example separating section in accordance with one or more embodiments.
Figure 6B:
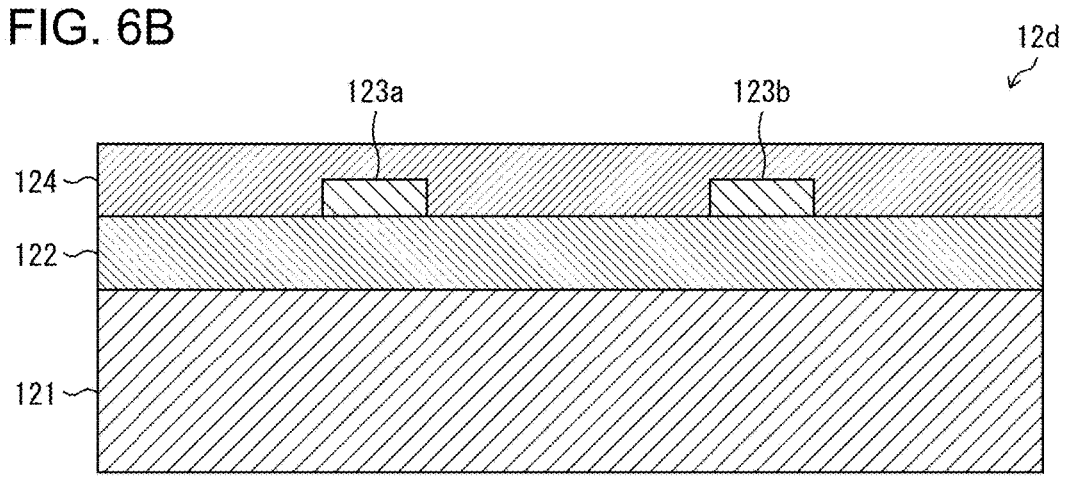
FIG. 6B is a cross-sectional view of an example separating section in accordance with one or more embodiments.

With reference to FIGS. 6A and 6B, the description below deals with an example separating section 12d included in the polarization conversion/multiplexing section 12 having the first example configuration. FIG. 6A is a plan view of a separating section 12d of the present example in accordance with one or more embodiments. FIG. 6B is a cross-sectional view of the separating section 12d of the present example in accordance with one or more embodiments. FIG. 6A illustrates, together with the separating section 12d, the input light guide path 12a, first intermediate light guide path 12c1 (in part), and second intermediate light guide path 12c2 (in part) of the polarization conversion/multiplexing section 12 having the first example configuration.

The separating section 12d includes (1) a substrate 121, (2) a lower cladding layer 122 disposed on the substrate 121, (3) two cores 123a and 123b disposed on the lower cladding layer 122, and (4) an upper cladding layer 124 disposed on the lower cladding layer 122 in such a manner as to bury the two cores 123a and 123b. The lower cladding layer 122 and the upper cladding layer 124 each have a refractive index lower than the refractive index of each of the cores 123a and 123b.

The substrate 121 and the cores 123a and 123b may each be made of silicon, for example. The lower cladding layer 122 and the upper cladding layer 124 may each be made of silica, for example. In other words, the separating section 12d may be a silicon light guide path as with the mode conversion section 11 illustrated in FIGS. 2A and 2B or FIGS. 4A and 4B. In this case, the substrate 121, lower cladding layer 122, cores 123a and 123b, and upper cladding layer 124 of the separating section 12d are respectively extensions of the substrate 111, lower cladding layer 112, cores 113a and 113b, and upper cladding layer 114 of the mode conversion section 11 illustrated in FIGS. 2A and 2B or FIGS. 4A and 4B.

The two cores 123a and 123b in the separating section 12d have (i) respective input-side ends connected respectively to the respective output-side ends of the two cores constituting the input light guide path 12a, and (ii) respective output-side ends connected respectively to the respective input-side ends of the two intermediate light guide paths 12c1 and 12c2. The two cores 123a and 123b in the separating section 12d are curved in such a manner as to be separated from each other by a larger distance as farther away from the respective input-side ends of the two cores 123a and 123b.

The two cores 123a and 123b in the separating section 12d have respective input-side ends connected respectively to the respective output-side ends of the two cores constituting the input light guide path 12a. Thus, (i) a TE fundamental mode TE(0) being excited on the input light guide path 12a causes TE fundamental modes TE(0) having an identical phase to be excited respectively on the two cores 123a and 123b in the separating section 12d, and (ii) a TE higher mode TE(1) being excited on the input light guide path 12a causes TE fundamental modes TE(0) having opposite phases to be excited respectively on the two cores 123a and 123b in the separating section 12d. The two cores 123a and 123b in the separating section 12d have respective output-side ends connected respectively to the respective input-side ends of the two intermediate light guide paths 12c1 and 12c2. Thus, the respective TE fundamental modes TE(0) being excited on the two cores 123a and 123b in the separating section 12d causes a TE fundamental mode TE(0) to be excited on each of the two intermediate light guide paths 12c1 and 12c2. With this configuration, a TE fundamental mode TE(0) and TE higher mode TE(1) for the input light guide path 12a are converted by the separating section 12d into a TE fundamental mode TE(0) for each of the two intermediate light guide paths 12c1 and 12c2.

The two cores 123a and 123b in the separating section 12d are curved in such a manner as to be separated from each other by a larger distance as farther away from the respective input-side ends of the two cores 123a and 123b. This causes optical coupling between the respective TE fundamental modes TE(0) excited on the cores 123a and 123b in the separating section 12d to become (i) smaller as farther away from the respective input-side ends of the cores 123a and 123b and (ii) zero or substantially zero in the vicinity of the respective output-side ends of the cores 123a and 123b. Thus, the respective TE fundamental modes TE(0) excited on the two intermediate light guide paths 12c1 and 12c2 may be regarded as two independent waveguide modes that are not optically coupled to each other.

[Second Example Configuration of Polarization Conversion/Multiplexing Section]

Figure 7A:
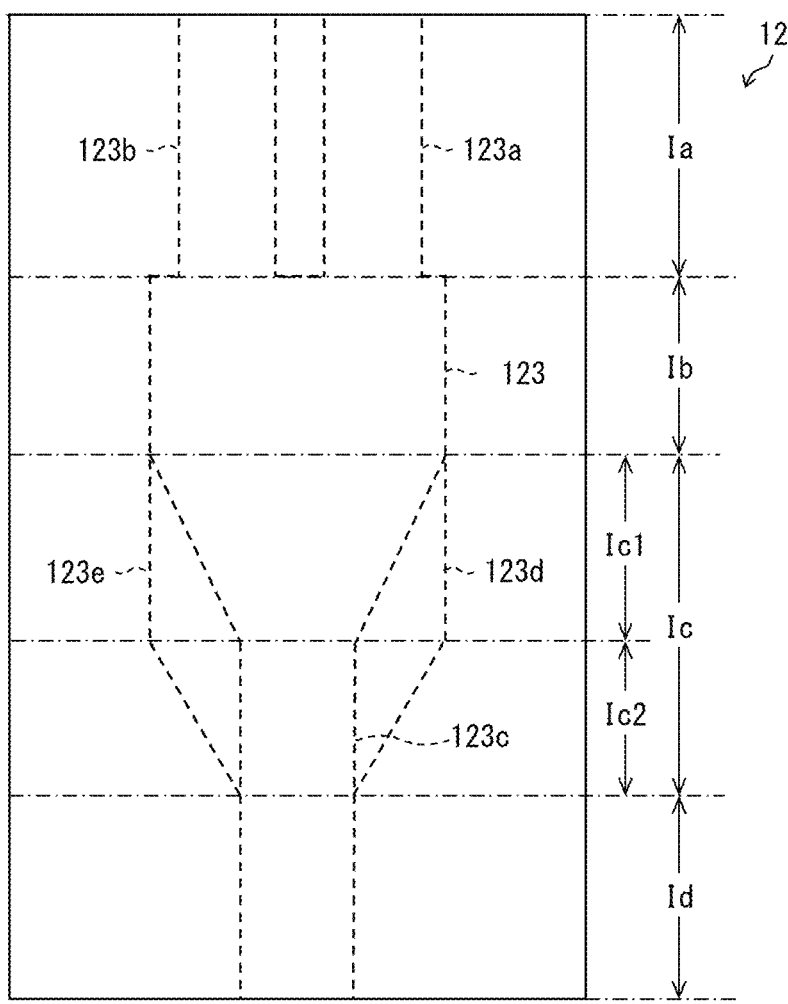
FIG. 7A is a plan view of a second example configuration of a polarization conversion/multiplexing section in accordance with one or more embodiments.
Figure 7B:
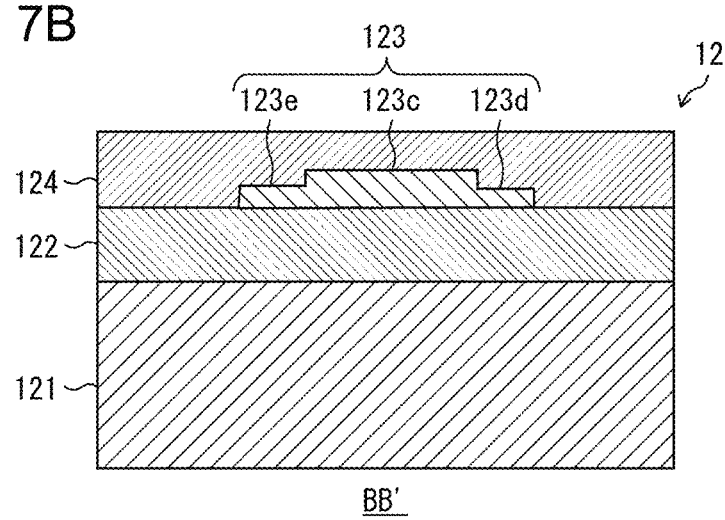
FIG. 7B is a cross-sectional view of the second example configuration of the polarization conversion/multiplexing section in accordance with one or more embodiments.

The description below deals with a second example configuration of the polarization conversion/multiplexing section 12 of the substrate-type optical waveguide 1 with reference to FIGS. 7A and 7B. FIG. 7A is a plan view of a polarization conversion/multiplexing section 12 having the present example configuration in accordance with one or more embodiments. FIG. 7B is a cross-sectional view of the polarization conversion/multiplexing section 12 having the present example configuration in accordance with one or more embodiments.

The polarization conversion/multiplexing section 12 having the present example configuration includes (1) a substrate 121, (2) a lower cladding layer 122 disposed on the substrate 121, (3) a core 123 disposed on the lower cladding layer 122, and (4) an upper cladding layer 124 disposed on the lower cladding layer 122 in such a manner as to bury the core 123. The lower cladding layer 122 and the upper cladding layer 124 each have a refractive index lower than the refractive index of the core 123.

The substrate 121 and the core 123 may each be made of silicon, for example. The lower cladding layer 122 and the upper cladding layer 124 may each be made of silica, for example. In other words, the polarization conversion/multiplexing section 12 may be a silicon light guide path as with the mode conversion section 11 illustrated in FIG. 2A, 2B, 4A, or 4B. In this case, the substrate 121, lower cladding layer 122, core 123, and upper cladding layer 124 of the polarization conversion/multiplexing section 12 are respectively extensions of the substrate 111, lower cladding layer 112, cores 113a and 113b, and upper cladding layer 114 of the mode conversion section 11 illustrated in FIG. 2A, 2B, 4A, or 4B.

The polarization conversion/multiplexing section 12 having the present example configuration is divided into four segments Ia to Id on the basis of the structure. The core 123 functions as the above input light guide path 12a in the segment Ia, which is the farthest on the input side, and as the output light guide path 12b in the segment Id, which is the farthest on the output side.

In the segment Ia, the core 123 is divided into two cores 123a and 123b. The two cores 123a and 123b are arranged adjacently to each other. The core 123a has a waveguide mode optically coupled to a waveguide mode of the core 123b. The two cores 123a and 123b thus function as a single light guide path. The segment Ia has a pair of rectangular light guide paths as the cores 123a and 123b.

The segment Ib has a rectangular light guide path as the core 123. The core 123 has a width in the segment Ib which width is slightly larger than the width of the core 123 in the segment Ia (that is, the distance between the right-side wall of the right-side core 123a and the left-side wall of the left-side core 123b).

The segment Ic has a rib-slab type light guide path as the core 123. A rib-slab type light guide path is a light guide path including a rib part (which is relatively high) and a slab part (which is relatively low). The present example configuration, in particular, uses a rib-slab type light guide path that includes a centrally positioned rib part 123c and two slab parts 123d and 123e positioned in such a manner as to sandwich the rib part 123c and that has an inverted-T cross section. At the input-side end of the segment Ic, the slab parts 123d and 123e each have a width of 0, and the rib part 123c has a width equal to the width of the core 123 in the segment Ib. At the output-side end of the segment Ic, the slab parts 123d and 123e each have a width of 0, and the rib part 123c has a width equal to the width of the core 123 in the segment Id.

The segment Ic is divided further into two sub-segments Ic1 and Ic2. In the input-side sub-segment Ic1, the slab parts 123d and 123e each have a width that becomes gradually larger as farther away from the input-side end. The sum of the width of the rib part 123c and the respective widths of the slab parts 123d and 123e is uniform across the sub-segment Ic1. The rib part 123c has a width that becomes gradually smaller as farther away from the input-side end. In the output-side sub-segment Ic2, the slab parts 123d and 123e each have a width that becomes gradually smaller as farther away from the input-side end. The width of the rib part 123c is uniform across the sub-segment Ic2. The sum of the width of the rib part 123c and the respective widths of the slab parts 123d and 123e becomes gradually smaller as farther away from the input-side end.

The segment Id has a rectangular light guide path as the core 123. The core 123 has a width in the segment Id which width is equal to the width of the rib part 123c in the sub-segment Ic2.

A TE fundamental mode TE(0) being excited in the segment Ia (input light guide path 12a) causes a TE fundamental mode TE(0) to be excited in the segment Ib as well. The segment Ic, which has a rib-slab type light guide path, converts the TE fundamental mode TE(0) in the segment Ib into a TE fundamental mode TE(0) in the segment Id (output light guide path 12b). It follows that a TE fundamental mode TE(0) is excited in the segment Id (output light guide path 12b).

A TE higher mode TE(1) being excited in the segment Ia (input light guide path 12a) causes a TE higher mode TE(1) to be excited in the segment Ib as well. The segment Ic, which has a rib-slab type light guide path, converts the TE higher mode TE(1) in the segment Ib into a TM fundamental mode TM(0) in the segment Id (output light guide path 12b). It follows that a TM fundamental mode TM(0) is excited in the segment Id (output light guide path 12b).

As described above, the polarization conversion/multiplexing section 12 having the present example configuration converts (i) a TE fundamental mode TE(0) for the input light guide path 12a into a TE fundamental mode TE(0) for the output light guide path 12b and (ii) a TE higher mode TE(1) for the input light guide path 12a into a TM fundamental mode TM(0) for the output light guide path 12b.

[Effects]

The description below deals with the effects of the substrate-type optical waveguide 1 of one or more embodiments with reference to FIGS. 8 and 9.

Figure 8:
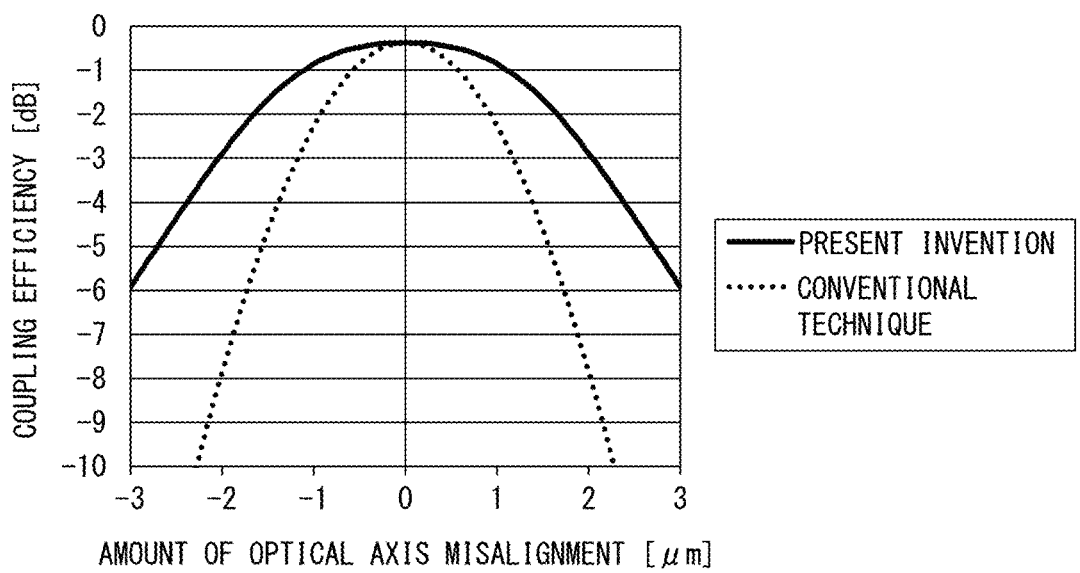
FIG. 8 is a graph illustrating the dependency, on the amount of optical axis misalignment, of the efficiency of coupling with an optical fiber for each of a substrate-type optical waveguide in accordance with one or more embodiments of the present invention and a conventional substrate-type optical waveguide.

FIG. 8 is a graph illustrating the dependency, on the amount of optical axis misalignment, of the efficiency of coupling with an optical fiber for each of the substrate-type optical waveguide 1 of one or more embodiments and a conventional substrate-type optical waveguide. Assuming a case where an optical fiber is coupled to a substrate-type optical waveguide via a lens system, a case where a fiber with a spherical tip is coupled to a substrate-type optical waveguide, or a case where a core with a small diameter is connected to a substrate-type optical waveguide, the description below deals with an example in which input light has a beam cross section in the shape of a circle and a mode field diameter of 3 μm.

FIG. 8 shows a solid line indicative of the results of numerical simulation for a substrate-type optical waveguide 1 of one or more embodiments which substrate-type optical waveguide 1 includes a mode conversion section 11 having the first example configuration (FIGS. 2A and 2B) and a polarization conversion/multiplexing section 12 having the second example configuration (FIG. 5). The mode conversion section 11 includes cores 113a and 113b that are made of silicon, that are each a rectangular light guide path having a width of 0.18 μm and a height of 0.22 μm, and that are separated from each other by a distance of 1 μm. The lower cladding layer 112 is a silica layer having a thickness of 3 μm. The upper cladding layer 114 is a silica layer having a thickness of 2 μm. FIG. 8 shows a dotted line indicative of the results of numerical simulation for a conventional substrate-type optical waveguide (see Non-Patent Literature 1) including a mode conversion section followed by a single-mode light guide path connected to the mode conversion section.

A comparison between the respective coupling efficiencies shown in FIG. 8 of the substrate-type optical waveguide 1 of one or more embodiments and the conventional substrate-type optical waveguide shows that the former becomes decreased by an optical axis misalignment to a smaller degree than the latter. This indicates that the substrate-type optical waveguide 1 of one or more embodiments has a larger tolerance for an optical axis misalignment than the conventional substrate-type optical waveguide.

Figure 9:
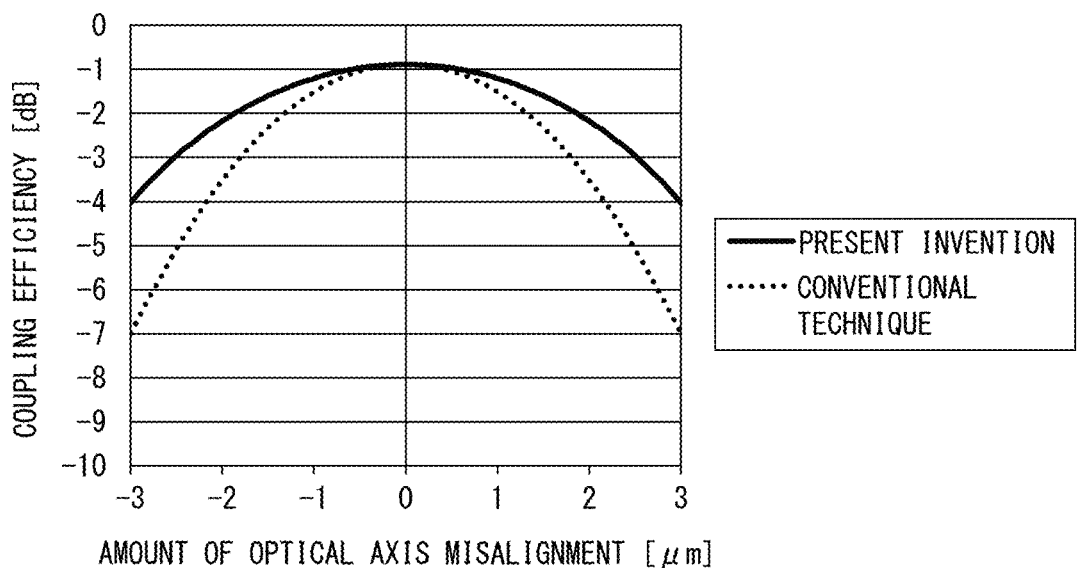
FIG. 9 is a graph illustrating the dependency, on the amount of optical axis misalignment, of the efficiency of coupling with a laser diode for each of a substrate-type optical waveguide in accordance with one or more embodiments of the present invention and a conventional substrate-type optical waveguide.

FIG. 9 is a graph illustrating the dependency, on the amount of optical axis misalignment, of the efficiency of coupling with a laser diode for each of the substrate-type optical waveguide 1 of one or more embodiments and a conventional substrate-type optical waveguide. The description below deals with an example in which input light has a beam cross section in the shape of a rectangle, a horizontal mode field diameter of 6 μm, and a vertical mode field diameter of 3 μm.

FIG. 9 shows a solid line indicative of the results of numerical simulation for a substrate-type optical waveguide 1 of one or more embodiments which substrate-type optical waveguide 1 includes a mode conversion section 11 having the first example configuration (FIGS. 2A and 2B) and a polarization conversion/multiplexing section 12 having the second example configuration (FIG. 5). The mode conversion section 11 includes cores 113a and 113b that are made of silicon, that are each a rectangular light guide path having a width of 0.18 μm and a height of 0.22 μm, and that are separated from each other by a distance of 2 μm. The lower cladding layer 112 is a silica layer having a thickness of 3 μm. The upper cladding layer 114 is a silica layer having a thickness of 2 μm. FIG. 9 shows a dotted line indicative of the results of numerical simulation for a conventional substrate-type optical waveguide (see Non-Patent Literature 1) including a mode conversion section followed by a single-mode light guide path connected to the mode conversion section.

A comparison between the respective coupling efficiencies shown in FIG. 9 of the substrate-type optical waveguide 1 of one or more embodiments and the conventional substrate-type optical waveguide shows that the former becomes decreased by an optical axis misalignment to a smaller degree than the latter. This indicates that the substrate-type optical waveguide 1 of one or more embodiments has a larger tolerance for an optical axis misalignment than the conventional substrate-type optical waveguide.

Example Application 1

Figure 10:
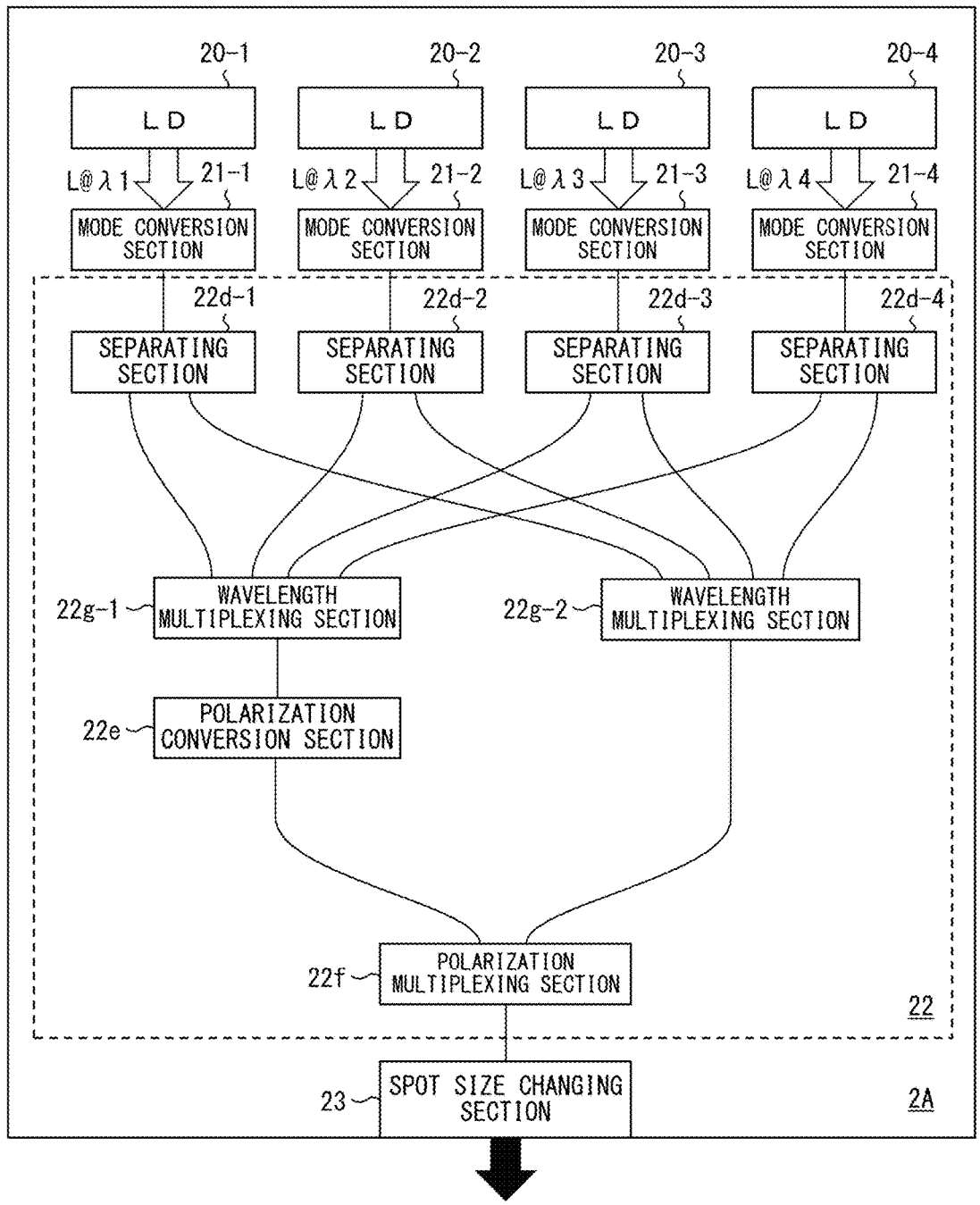
FIG. 10 is a block diagram illustrating an example application of a substrate-type optical waveguide in accordance with one or more embodiments.
Figure 11:
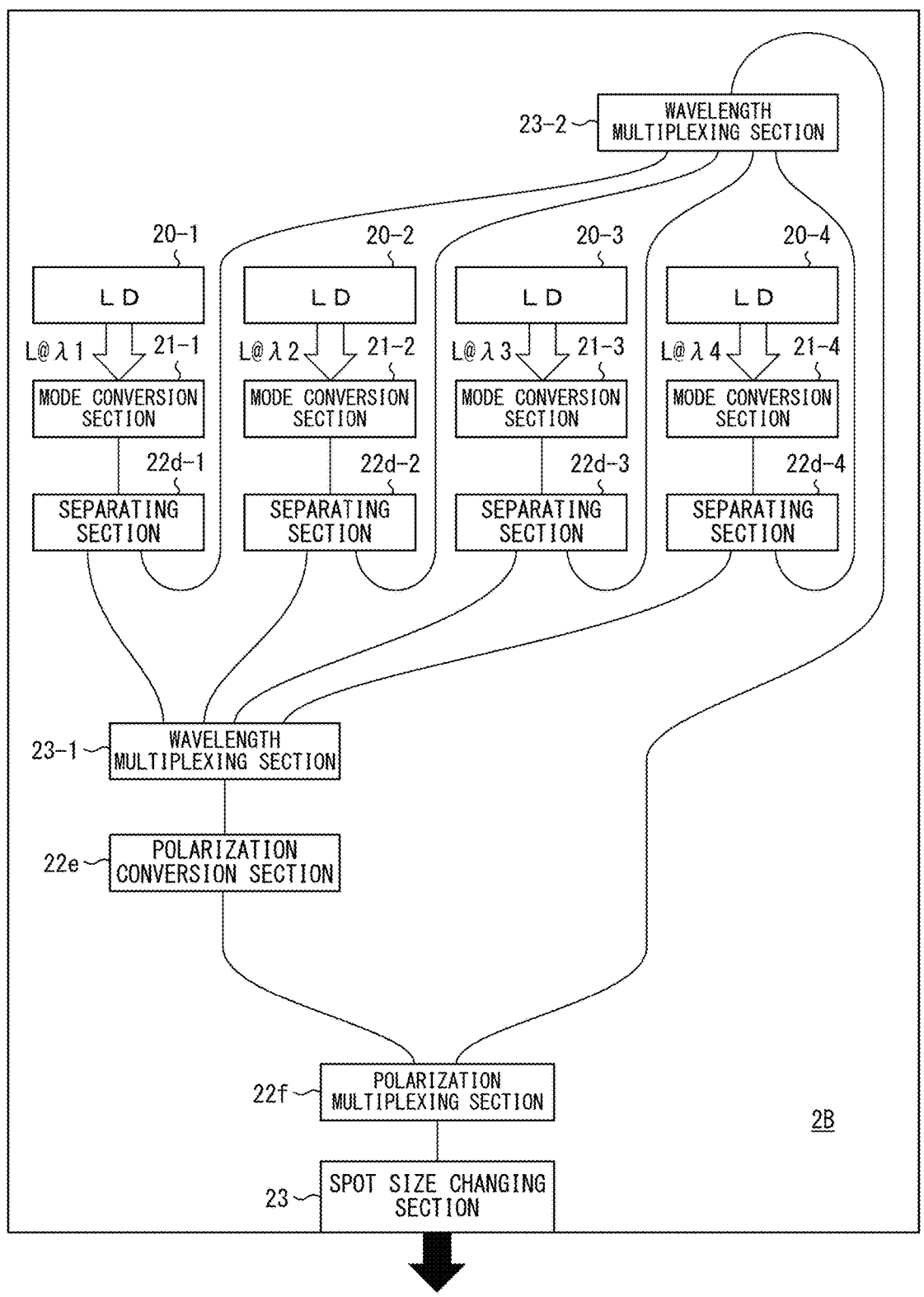
FIG. 11 is a block diagram illustrating an example application of a substrate-type optical waveguide in accordance with one or more embodiments.

The idea described above is applicable to a substrate-type optical waveguide configured to cause respective laser beams from a plurality of laser diodes to be inputted into an optical fiber. FIG. 10 is a block diagram illustrating a first specific example of such a substrate-type optical waveguide in accordance with one or more embodiments. FIG. 11 is a block diagram illustrating a second specific example of such a substrate-type optical waveguide in accordance with one or more embodiments.

FIG. 10 illustrates, as the first specific example, a substrate-type optical waveguide 2A including four LDs 20-1 to 20-4, four mode conversion sections 21-1 to 21-4, a polarization conversion/multiplexing section 22, and a spot size changing section 23. Light outputted from the spot size changing section 23 is inputted into an optical fiber.

The mode conversion sections 21-1 to 21-4 are, similarly to the mode conversion section 11 described above, each a means of converting input light having been inputted into the input light guide path into a superposition of a TE fundamental mode TE(0) and TE higher mode TE(1) for the output light guide path. The mode conversion sections 21-1 to 21-4 are each configured similarly to the mode conversion section 11 described above.

The polarization conversion/multiplexing section 22 is, similarly to the polarization conversion/multiplexing section 12 described above, a means of converting the superposition of the TE fundamental mode and TE higher mode for the input light guide path into a superposition of a TE fundamental mode and TM fundamental mode for the output light guide path. The polarization conversion/multiplexing section 22 includes separating sections 22d-1 to 22d-4, wavelength multiplexing sections 22g-1 and 22g-2, a polarization conversion section 22e, and a polarization multiplexing section 22f. The separating sections 22d-1 to 22d-4 are each configured similarly to the separating section 12d described above. The polarization conversion section 22e is configured similarly to the polarization conversion section 12e described above. The polarization multiplexing section 22f is configured similarly to the polarization multiplexing section 12f described above. The wavelength multiplexing sections 22g-1 and 22g-2 appear here for the first time for the present example application.

The substrate-type optical waveguide 2A in FIG. 10 functions as follows: First, the LDs 20-1 to 20-4 output respective laser beams L@λ1 to L@λ4 having respective wavelengths different from each other. The laser beams L@λ1 to L@λ4 are inputted respectively into the respective input light guide paths of the mode conversion sections 21-1 to 21-4. Each mode conversion section 21-i (where i=1 to 4) converts the laser beam L@λi having been inputted into the input light guide path into a superposition of a TE fundamental mode TE(0)@λi and a TE higher mode TE(1)@λi. Each separating section 22d-i converts the superposition of the TE fundamental mode TE(0)@λi and TE higher mode TE(1)@λi for the input light guide path into a TE fundamental mode TE(0)@λi for each of two output light guide paths. The respective TE fundamental modes TE(0)@λ1 to TE(0)@λ4 for respective first output light guide paths of the four separating sections 22d-1 to 22d-4 are subjected to wavelength multiplexing by the wavelength multiplexing section 22g-1 and are inputted into the input light guide path of the polarization conversion section 22e. The polarization conversion section 22e converts the TE fundamental modes TE(0)@λ1 to TE(0)@λ4 into TM fundamental modes TM(0)@λ1 to TM(0)@λ4. The TM fundamental modes TM(0)@λ1 to TM(0)@λ4 for the output light guide path of the polarization conversion section 22e are inputted into a first input light guide path of the polarization multiplexing section 22f. The respective TE fundamental modes TE(0)@λ1 to TE(0)@λ4 for respective second output light guide paths of the four separating sections 22d-1 to 22d-4 are subjected to wavelength multiplexing by the wavelength multiplexing section 22g-2, and are inputted into a second input light guide path of the polarization multiplexing section 22f. The polarization multiplexing section 22f multiplexes (i) the TM fundamental modes TM(0)@λ1 to TM(0)@λ4 having been inputted into the first input light guide path and (ii) the TE fundamental modes TE(0)@λ1 to TE(0)@λ having been inputted into the second input light guide path. Output light TE(0)+TM(0) from the polarization multiplexing section 22f is inputted into the spot size changing section 23, which then increases the spot size of the output light and outputs the output light to the outside of the substrate-type optical waveguide 2A.

The LDs 20-1 to 20-4 may be four separate LD elements or a single LD array including four integrated LDs. The LDs 20-1 to 20-4 may be mounted on the substrate-type optical waveguide 2A by creating one or more cavities on the surface of the substrate-type optical waveguide 2A and embedding LD elements or an LD array in the one or more cavities. The wavelength multiplexing sections 22g-1 and 22g-2 may each be, for example, a lattice filter, a ring resonator, an echelle grating, or an arrayed waveguide grating (AWG).

FIG. 11 illustrates, as the second specific example, a substrate-type optical waveguide 2B, which is similar to the substrate-type optical waveguide 2A illustrated in FIG. 10 as the first specific example, but is different therefrom in the layout of the individual functional devices. While the substrate-type optical waveguide 2A as the first specific example has intersecting light guide paths, the substrate-type optical waveguide 2B as the second specific example has non-intersecting light guide paths. This indicates that the substrate-type optical waveguide 2B as the second specific example can be produced more easily than the substrate-type optical waveguide 2A as the first specific example. Further, the substrate-type optical waveguide 2B as the second specific example suffers from less cross talk and a smaller loss than the substrate-type optical waveguide 2A as the first specific example. Although FIG. 11 does not show a dashed line indicative of the range of the polarization conversion/multiplexing section 22, the substrate-type optical waveguide 2B is also configured such that the separating sections 22d-1 to 22d-4, the wavelength multiplexing sections 22g-1 and 22g-2, the polarization conversion section 22e, and the polarization multiplexing section 22f constitute a polarization conversion/multiplexing section 22.

Example Application 2

Figure 12:
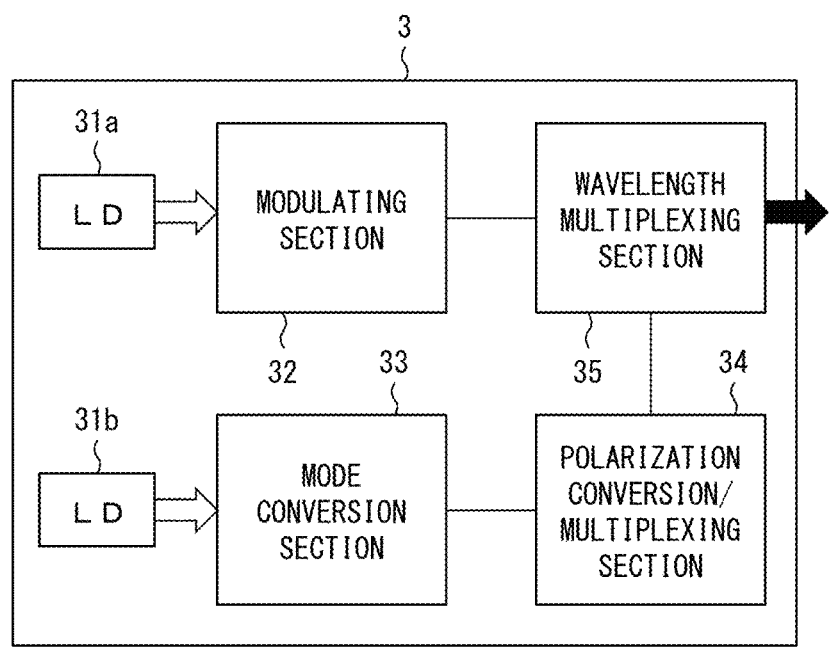
FIG. 12 is a block diagram illustrating an example application of a substrate-type optical waveguide in accordance with one or more embodiments.

The idea described above is applicable to a substrate-type optical waveguide configured to cause signal light and carrier light having respective wavelengths different from each other to be inputted into an optical fiber. FIG. 12 is a block diagram illustrating a specific example of such a substrate-type optical waveguide in accordance with one or more embodiments.

FIG. 12 illustrates a substrate-type optical waveguide 3 including two LDs 31a and 31b, a modulating section 32, a mode conversion section 33, a polarization conversion/multiplexing section 34, and a wavelength multiplexing section 35. Light outputted from the wavelength multiplexing section 35 is inputted into an optical fiber. The mode conversion section 33 may be the mode conversion section 11 of the first specific example (FIGS. 2A and 2B) or the mode conversion section 11 of the second specific example (FIGS. 4A and 4B). The polarization conversion/multiplexing section 34 may be the polarization conversion/multiplexing section 12 of the first specific example (FIGS. 5, 6A, and 6B) or the polarization conversion/multiplexing section 12 of the second specific example (FIGS. 7A and 7B).

The substrate-type optical waveguide 3 in FIG. 12 functions as follows: First, the LD 31a outputs carrier light having a wavelength λ1 (for example, 1310 nm). The carrier light having the wavelength λ1 is inputted into the modulating section 32. The modulating section 32 modulates the carrier light having the wavelength λ1 into signal light having the wavelength λ1. The signal light having the wavelength λ1 is inputted into the wavelength multiplexing section 35.

The LD 31b outputs carrier light having a wavelength λ2 (for example, 1550 nm) different from the wavelength λ1. The carrier light having the wavelength λ2 is inputted into the mode conversion section 33. The mode conversion section 33 converts the carrier light having the wavelength λ2 into a superposition of a TE fundamental mode TE(0) and TE higher mode TE(1) for the output light guide path. The polarization conversion/multiplexing section 34 converts the superposition of the TE fundamental mode TE(0) and TE higher mode TE(1) for the input light guide path into a superposition of a TE fundamental mode TE(0) and TM fundamental mode TM(0) for the output light guide path. The wavelength multiplexing section 35 multiplexes respective wavelengths of (i) the signal light having the wavelength λ1 which signal light has been produced through the modulating section 32 and (ii) the carrier light having the wavelength λ2 which carrier light has been produced through the polarization conversion/multiplexing section 34. Output light from the wavelength multiplexing section 35 is outputted to the outside of the substrate-type optical waveguide 3.

The substrate-type optical waveguide 3 in FIG. 12 is configured such that the LD 31*b* and the wavelength multiplexing section 35 are connected to each other via the mode conversion section 33 and the polarization conversion/multiplexing section 34. This configuration, as compared to a case where the LD 31*b* and the wavelength multiplexing section 35 are not connected to each other via the mode conversion section 33 and the polarization conversion/multiplexing section 34, allows for a reduction of a decrease in the power of carrier light which decrease may be caused by an optical axis misalignment of the LD 31*b*.

[Supplemental Notes]

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

[Recap]

A substrate-type optical waveguide in accordance with one or more embodiments described above includes: a mode conversion section having an input light guide path and an output light guide path, the mode conversion section being configured to convert (i) light having been inputted into the input light guide path of the mode conversion section into (ii) either a superposition of a TE fundamental mode and a TE higher mode for the output light guide path of the mode conversion section or a superposition of a TM fundamental mode and a TM higher mode for the output light guide path of the mode conversion section; and a polarization conversion and multiplexing section having (i) an input light guide path connected to the output light guide path of the mode conversion section and (ii) an output light guide path, the polarization conversion and multiplexing section being configured to convert (i) either a superposition of a TE fundamental mode and a TE higher mode for the input light guide path of the polarization conversion and multiplexing section or a superposition of a TM fundamental mode and a TM higher mode for the input light guide path of the polarization conversion and multiplexing section into (ii) a superposition of a TE fundamental mode and a TM fundamental mode for the output light guide path of the polarization conversion and multiplexing section.

The above configuration provides a substrate-type optical waveguide having (i) an efficiency of input light coupling which efficiency is higher than conventional and (ii) a tolerance for an optical axis misalignment which tolerance is higher than conventional.

The substrate-type optical waveguide in accordance with one or more embodiments described above may be configured such that the input light guide path of the mode conversion section has a waveguide mode having a mode field diameter that becomes larger toward an entrance end surface.

The above configuration further increases the efficiency of coupling with input light having a large mode field diameter.

The substrate-type optical waveguide in accordance with one or more embodiments described above may be configured such that the input light guide path of the mode conversion section includes, for example, a pair of inverse-tapered light guide paths. The substrate-type optical waveguide in accordance with one or more embodiments described above may be configured such that the input light guide path of the mode conversion section includes, for example, a pair of divided light guide paths. The divided light guide paths may each include blocks which have respective widths that become smaller toward the entrance end surface or in each of which the proportion of portions at each of which a block is present becomes smaller toward the entrance end surface.

The substrate-type optical waveguide in accordance with one or more embodiments described above may be configured such that in a case where the mode conversion section is configured to convert the light into the superposition of the TE fundamental mode and the TE higher mode for the output light guide path of the mode conversion section, the polarization conversion and multiplexing section includes, for example: (1) a first intermediate light guide path and a second intermediate light guide path having respective waveguide modes that are not optically coupled to each other; (2) a separating section configured to convert the TE fundamental mode and the TE higher mode for the input light guide path of the polarization conversion and multiplexing section respectively into a TE fundamental mode for an input-side portion of the first intermediate light guide path and a TE fundamental mode for the second intermediate light guide path; (3) a polarization conversion section configured to convert the TE fundamental mode for the input-side portion of the first intermediate light guide path into a TM fundamental mode for an output-side portion of the first intermediate light guide path; and (4) a polarization multiplexing section configured to polarization-multiplex the TM fundamental mode for the output-side portion of the first intermediate light guide path and the TE fundamental mode for the second intermediate light guide path.

The substrate-type optical waveguide in accordance with one or more embodiments described above may be configured such that in a case where the mode conversion section is configured to convert the light into the superposition of the TM fundamental mode and the TM higher mode for the output light guide path of the mode conversion section, the polarization conversion and multiplexing section includes, for example: (1) a first intermediate light guide path and a second intermediate light guide path having respective waveguide modes that are not optically coupled to each other; (2) a separating section configured to convert the TM fundamental mode and the TM higher mode for the input light guide path of the polarization conversion and multiplexing section respectively into a TM fundamental mode for an input-side portion of the first intermediate light guide path and a TM fundamental mode for the second intermediate light guide path; (3) a polarization conversion section configured to convert the TM fundamental mode for the input-side portion of the first intermediate light guide path into a TE fundamental mode for an output-side portion of the first intermediate light guide path; and (4) a polarization multiplexing section configured to polarization-multiplex the TE fundamental mode for the output-side portion of the first intermediate light guide path and the TM fundamental mode for the second intermediate light guide path.

The substrate-type optical waveguide in accordance with one or more embodiments described above may be configured such that in a case where the mode conversion section is configured to convert the light into the superposition of the TE fundamental mode and the TE higher mode for the output light guide path of the mode conversion section, the polarization conversion and multiplexing section has a rib-slab type light guide path configured to convert the TE higher mode for the input light guide path of the polarization conversion and multiplexing section into the TM fundamental mode for the output light guide path of the polarization conversion and multiplexing section and to convert the TE fundamental mode for the input light guide path of the polarization conversion and multiplexing section into the TE fundamental mode for the output light guide path of the polarization conversion and multiplexing section.

An introducing method in accordance with one or more embodiments described above is a method for introducing input light into a substrate-type optical waveguide, the method including the steps of: converting (i) input light having been inputted into a first light guide path into (ii) a superposition of a TE fundamental mode and a TE higher mode for a second light guide path; and converting (i) the superposition of the TE fundamental mode and the TE higher mode for the second light guide path into (ii) a superposition of a TE fundamental mode and a TM fundamental mode for a third light guide path.

The above introducing method provides a substrate-type optical waveguide having (i) an efficiency of input light coupling which efficiency is higher than conventional and (ii) a tolerance for an optical axis misalignment which tolerance is higher than conventional.

In a case where the introducing method in accordance with one or more embodiments described above is used in combination with a substrate-type optical waveguide in accordance with one or more embodiments of the present invention, the first light guide path corresponds to the input light guide path of the mode conversion section; the second light guide path corresponds to the output light guide path of the mode conversion section and the input light guide path of the polarization conversion and multiplexing section; and the third light guide path corresponds to the output light guide path of the polarization conversion and multiplexing section.

REFERENCE SIGNS LIST

1 Substrate-type optical waveguide
11 Mode conversion section
11a Input light guide path
11b Output light guide path
12 Polarization conversion/multiplexing section
12a Input light guide path
12b Output light guide path
12c1 First intermediate light guide path
12c2 Second intermediate light guide path
12d Separating section
12e Polarization conversion section
12f Polarization multiplexing section

The invention claimed is:
1. A substrate-type optical waveguide, comprising:
a mode conversion section comprising a first input light guide path and a first output light guide path; and
a polarization conversion and multiplexing section comprising a second input light guide path and a second output light guide path, wherein
the first output light guide path is connected to the second input light guide path,
the mode conversion section converts light input into the first input light guide path into one of:
a superposition of a first TE fundamental mode and a first TE higher mode; or
a superposition of a first TM fundamental mode and a first TM higher mode, and
the polarization conversion and multiplexing section converts the one of the superposition of the first TE fundamental mode and the first TE higher mode or the superposition of the first TM fundamental mode and the first TM higher mode into a superposition of a second TE fundamental mode and a second TM fundamental mode for the second output light guide path.

2. The substrate-type optical waveguide according to claim 1, wherein
the first input light guide path has a waveguide mode that has a mode field diameter that is larger toward an entrance end surface of the first input light guide path.

3. The substrate-type optical waveguide according to claim 2, wherein
the first input light guide path includes a pair of inverse-tapered light guide paths.

4. The substrate-type optical waveguide according to claim 2, wherein
the first input light guide path includes a pair of divided light guide paths.

5. The substrate-type optical waveguide according to claim 1, wherein
the mode conversion section converts the light into the superposition of the first TE fundamental mode and the first TE higher mode, and
the polarization conversion and multiplexing section includes:
a first intermediate light guide path and a second intermediate light guide path comprising respective waveguide modes not optically coupled to each other;
a separating section that converts the first TE fundamental mode and the first TE higher mode respectively into a TE fundamental mode for an input of the first intermediate light guide path and a TE fundamental mode for the second intermediate light guide path;
a polarization conversion section that converts the TE fundamental mode for the input of the first intermediate light guide path into a TM fundamental mode for an output of the first intermediate light guide path; and
a polarization multiplexing section that polarization-multiplexes the TM fundamental mode for the output of the first intermediate light guide path and the TE fundamental mode for the second intermediate light guide path.

6. The substrate-type optical waveguide according to claim 1, wherein
the mode conversion section converts the light into the superposition of the first TM fundamental mode and the first TM higher mode, and
the polarization conversion and multiplexing section includes:
a first intermediate light guide path and a second intermediate light guide path comprising respective waveguide modes not optically coupled to each other;
a separating section that converts the first TM fundamental mode and the first TM higher mode respectively into a TM fundamental mode for an input of the first intermediate light guide path and a TM fundamental mode for the second intermediate light guide path;
a polarization conversion section that converts the TM fundamental mode for the input of the first intermediate light guide path into a TE fundamental mode for an output of the first intermediate light guide path; and
a polarization multiplexing section that polarization-multiplexes the TE fundamental mode for the output of the first intermediate light guide path and the TM fundamental mode for the second intermediate light guide path.

7. The substrate-type optical waveguide according to claim 1, wherein
the mode conversion section converts the light into the superposition of the first TE fundamental mode and the first TE higher mode, and
the polarization conversion and multiplexing section comprises a rib-slab type light guide path,
the rib-slab type light guide converts the first TE higher mode into the second TM fundamental mode for the second output light guide path, and
the rib-slab type light guide converts the first TE fundamental mode into the second TE fundamental mode for the second output light guide path.

8. A method for introducing input light into a substrate-type optical waveguide, the method comprising:
converting light input into a first light guide path into a superposition of a first TE fundamental mode and a first TE higher mode for a second light guide path; and
converting the superposition of the first TE fundamental mode and the first TE higher mode for the second light guide path into a superposition of a second TE fundamental mode and a second TM fundamental mode for a third light guide path.

* * * * *